(12) United States Patent
Hirota et al.

(10) Patent No.: US 7,568,544 B2
(45) Date of Patent: Aug. 4, 2009

(54) OCCUPANT PROTECTION DEVICE FOR VEHICLE

(75) Inventors: Koichi Hirota, Takahama (JP); Koji Aoki, Nagoya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 182 days.

(21) Appl. No.: 11/113,061

(22) Filed: Apr. 25, 2005

(65) Prior Publication Data
US 2005/0236211 A1 Oct. 27, 2005

(30) Foreign Application Priority Data
Apr. 27, 2004 (JP) ............... 2004-132102

(51) Int. Cl.
*B60K 28/14* (2006.01)
(52) U.S. Cl. ............... 180/274; 701/45; 701/301; 280/735
(58) Field of Classification Search ............... 280/735, 280/734, 733, 806; 180/274, 271, 268; 701/45, 701/301; 307/10.1; 342/70
See application file for complete search history.

(56) References Cited

U.S. PATENT DOCUMENTS

| 3,675,190 | A | * | 7/1972 | Auer et al. | 367/93 |
|---|---|---|---|---|---|
| 4,497,025 | A | * | 1/1985 | Hannoyer | 701/45 |
| 4,910,512 | A | * | 3/1990 | Riedel | 340/943 |
| 5,011,181 | A | * | 4/1991 | Laucht et al. | 280/731 |
| 5,038,134 | A | * | 8/1991 | Kondo et al. | 340/438 |
| 5,040,118 | A | * | 8/1991 | Diller | 701/45 |
| 5,311,065 | A | * | 5/1994 | Kondo | 307/10.1 |
| RE34,637 | E | * | 6/1994 | Burger et al. | 280/735 |
| 5,398,185 | A | * | 3/1995 | Omura | 701/45 |
| 5,490,069 | A | * | 2/1996 | Gioutsos et al. | 701/45 |
| 6,037,674 | A | * | 3/2000 | Hargedon et al. | 307/10.1 |
| 6,068,287 | A | * | 5/2000 | Nitschke et al. | 280/735 |
| 6,142,524 | A | * | 11/2000 | Brown et al. | 280/806 |
| 6,169,945 | B1 | | 1/2001 | Bachmaier | |
| 6,182,783 | B1 | | 2/2001 | Bayley | |
| 6,216,070 | B1 | * | 4/2001 | Hayashi et al. | 701/45 |
| 6,295,495 | B1 | * | 9/2001 | Morman et al. | 701/45 |
| 6,486,566 | B1 | * | 11/2002 | Schumacher et al. | 307/10.1 |
| 6,746,049 | B2 | * | 6/2004 | Pavlov et al. | 280/803 |
| 6,837,516 | B2 | * | 1/2005 | Miyata et al. | 280/735 |
| 6,897,768 | B2 | * | 5/2005 | Sato et al. | 340/435 |

(Continued)

FOREIGN PATENT DOCUMENTS

DE 198 13 943 A1 9/1999

(Continued)

OTHER PUBLICATIONS

Japanese Laid Open Patent No. 2000-62559, Feb. 29, 2000.

(Continued)

*Primary Examiner*—John Q. Nguyen
*Assistant Examiner*—Karen Amores
(74) *Attorney, Agent, or Firm*—Sughrue Mion, PLLC

(57) ABSTRACT

An occupant protection device for vehicle includes an impact-predicting unit that predicts an impact of a vehicle, a controlling unit that controls activation of plural actuators mounted on the vehicle. The controlling unit sequentially drives, on a basis of at least an output from the impact-predicting unit, the plural actuators in accordance with a predetermined operating order.

15 Claims, 10 Drawing Sheets

U.S. PATENT DOCUMENTS

| | | | |
|---|---|---|---|
| 6,901,321 B1* | 5/2005 | Nitschke et al. | 701/45 |
| 6,945,560 B2* | 9/2005 | Strutz et al. | 280/735 |
| 7,102,539 B2* | 9/2006 | Kawazoe et al. | 340/940 |
| 7,109,850 B2* | 9/2006 | Kawazoe et al. | 340/425.5 |
| 7,138,938 B1* | 11/2006 | Prakah-Asante et al. | 342/70 |
| 7,142,965 B2* | 11/2006 | Metzger et al. | 701/45 |
| 7,170,193 B2* | 1/2007 | Ferre | 307/10.1 |
| 7,205,505 B2* | 4/2007 | Diemer et al. | 219/217 |
| 7,234,560 B2* | 6/2007 | Chen | 180/271 |
| 2002/0188393 A1* | 12/2002 | Yokota et al. | 701/45 |
| 2003/0001772 A1* | 1/2003 | Woodington et al. | 342/70 |
| 2003/0009273 A1* | 1/2003 | Stanley et al. | 701/45 |
| 2004/0007860 A1* | 1/2004 | Miyata et al. | 280/735 |
| 2004/0024508 A1* | 2/2004 | Sakai et al. | 701/45 |
| 2004/0111200 A1* | 6/2004 | Rao et al. | 701/45 |
| 2004/0117091 A1* | 6/2004 | Prakah-Asante et al. | 701/45 |
| 2004/0199318 A1* | 10/2004 | Shieh et al. | 701/45 |
| 2004/0262901 A1* | 12/2004 | Brewster et al. | 280/741 |
| 2005/0017486 A1* | 1/2005 | David et al. | 280/735 |
| 2005/0021206 A1* | 1/2005 | Metzger et al. | 701/45 |
| 2005/0168072 A1* | 8/2005 | Saito et al. | 307/10.1 |
| 2005/0184495 A1* | 8/2005 | Zerbe | 280/735 |
| 2005/0236211 A1* | 10/2005 | Hirota et al. | 180/274 |
| 2006/0085114 A1* | 4/2006 | Roelleke et al. | 701/45 |
| 2006/0097505 A1* | 5/2006 | Midorikawa | 280/806 |
| 2006/0129295 A1* | 6/2006 | Foo et al. | 701/45 |
| 2006/0138758 A1* | 6/2006 | Roelleke et al. | 280/735 |
| 2006/0155469 A1* | 7/2006 | Kawasaki | 701/301 |
| 2006/0173598 A1* | 8/2006 | Moldenhauer et al. | 701/45 |
| 2006/0229784 A1* | 10/2006 | Bachmann et al. | 701/45 |
| 2006/0273559 A1* | 12/2006 | Uono et al. | 280/735 |
| 2007/0005207 A1* | 1/2007 | Foo et al. | 701/45 |
| 2007/0055428 A1* | 3/2007 | Kong et al. | 701/45 |
| 2007/0055429 A1* | 3/2007 | Komaki et al. | 701/45 |
| 2007/0057494 A1* | 3/2007 | Rauh et al. | 280/735 |
| 2007/0067082 A1* | 3/2007 | Watts | 701/45 |
| 2007/0100527 A1* | 5/2007 | Rao et al. | 701/45 |
| 2007/0124049 A1* | 5/2007 | Lich et al. | 701/45 |
| 2007/0152433 A1* | 7/2007 | Weichenberger et al. | 280/735 |

FOREIGN PATENT DOCUMENTS

| | | |
|---|---|---|
| DE | 102 12 963 A1 | 10/2003 |
| JP | 11-334437 | 7/1999 |
| JP | 2000-062559 | 2/2000 |
| JP | 2000-228898 A | 8/2000 |
| JP | 2001-058552 A | 3/2001 |
| JP | 2003 165 406 A | 6/2003 |

OTHER PUBLICATIONS

Japanese Laid Open Patent No. H11-334437, Dec. 7, 1999.

* cited by examiner

OCCUPANT PROTECTION DEVICE FOR VEHICLE

CROSS REFERENCE TO RELATED APPLICATIONS

This application is based on and claims priority under 35 U.S.C. §119 with respect to Japanese Patent Application 2004-132102, filed on Apr. 27, 2004, the entire content of which is incorporated herein by reference.

FIELD OF THE INVENTION

This invention generally relates to an occupant protection device which is provided with an impact early-warning unit for foreseeing an impact of a vehicle.

BACKGROUND

In general, vehicles have been provided with safety equipments such as seat belts and airbags, inter alia, for the purpose of protecting vehicle occupants as a result of a vehicle crash (including overturn and rollover). However, depending on a longitudinal position of a seat, on which an occupant has actually been seated, or on a degree to which a seat back is reclined, these safety equipments do not always perform to a sufficient stand.

In the light of the foregoing, recent requirements have led to maintaining factors within a vehicle, such as seat posture, in conditions of a high level of safety in anticipation of a vehicle impact (including overturn and rollover). For example, JP2000-62559A, especially as described in pages 3 and 4, and as illustrated in FIG. 3, discloses an occupant protection device for vehicle in the event of a vehicle rollover. In this system, when an occurrence of a vehicle rollover is detected, a seat belt is tightened around a vehicle occupant, whereby the occupant is constricted within the seat. Moreover, in this system, when a window is open, the window is closed, and the occupant is prevented from falling out of the vehicle.

However, in order to actually prepare a vehicle for the eventuality of a vehicle crash, it is necessary to operate at the same time, by means of actuators, a considerable number of components such as an occupant seat, a seat belt and a vehicle window. In such circumstances, a considerable number of actuators such as motors are all driven together at the same time. A waveform chart illustrated in FIG. 11 explains transitions in degrees of electric power consumed in the course of driving motors that can operate components such as a sunroof, a side window of a vehicle seat A, a seat sliding mechanism of the vehicle seat A and a seat reclining mechanism of the vehicle seat A. In general, a motor requires a great amount of electric power when it is initially driven, and is supplied with a great amount of inrush current. Such inrush current is depicted by a current waveform of an impulse shape, as shown in the waveform chart illustrated in FIG. 11.

As described above, when a considerable number of motors are driven at the same time in response to early warning of a vehicle crash, the considerable number of motors are supplied with inrush current at the same time. In such a case, a high current may be supplied to all wires for feeding electric current to these motors. As a result, a level of voltage may drop, due to resistance in the wires, or due to deficiencies in the amount of electric current that a battery can supply to the motors. The motors may then not be able to generate torque at a sufficient level, and the components operated by the motors may not be able to operate in the desired manner.

The present invention has been made in view of the above circumstances, and provides an occupant protection device for vehicle, according to which conditions inside a vehicle, such as seat postures and safety devices, can be brought to a high level of safety quickly, and thereafter maintained effectively at a high level of safety.

SUMMARY OF THE INVENTION

According to an aspect of the present invention, an occupant protection device includes an impact-predicting unit for predicting an impact of a vehicle, and a controlling unit for controlling activation of plural actuators mounted on the vehicle. The controlling unit sequentially drives on a basis of at least an output from the impact-predicting unit, the plural actuators in accordance with a predetermined operating order.

According to another aspect of the present invention, an occupant protection device includes an impact-predicting unit for predicting an impact of a vehicle, and a controlling unit for controlling activation of plural actuators mounted on the vehicle. The plural actuators have been classified into plural actuator groups in accordance with a predetermined classification condition. The controlling unit sequentially drives, on a basis of at least an output from the impact-predicting unit and in accordance with a predetermined order of precedence in terms of the actuator groups, actuators classified into the respective actuator groups.

According to still another aspect of the present invention, an occupant protection device includes an impact-predicting unit for predicting an impact of a vehicle, and a main controlling unit for controlling, via plural auxiliary controlling unit, activation of plural actuators mounted on the vehicle. The plural actuators have been classified into plural actuator groups in accordance with a predetermined classification condition. The main controlling means sequentially outputs, on a basis of at least one output from the impact-predicting unit and in accordance with a predetermined order of precedence, drive commands to the respective plural auxiliary controlling unit, and the respective plural auxiliary controlling unit sequentially drives, in accordance with a predetermined operating order, the respective actuators classified into the respective actuator groups.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be described hereinbelow in detail with reference to the accompanying drawings.

Figure 1A:
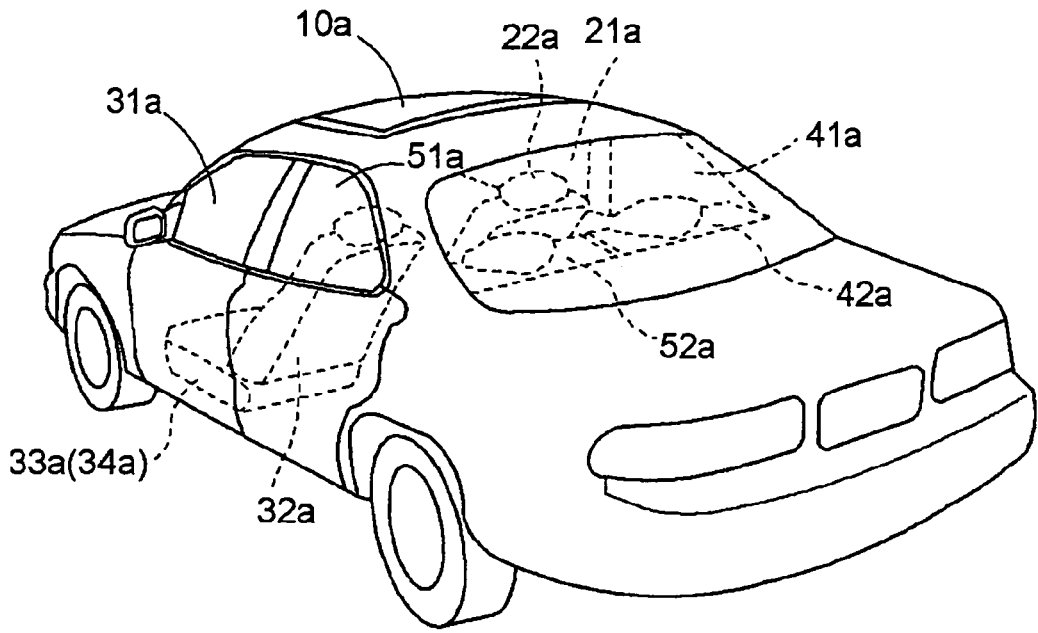
FIGS. 1A and 1B are schematic diagrams illustrating objects, or units, controlled by an occupant protection device according to embodiments of the present invention.
Figure 1B:
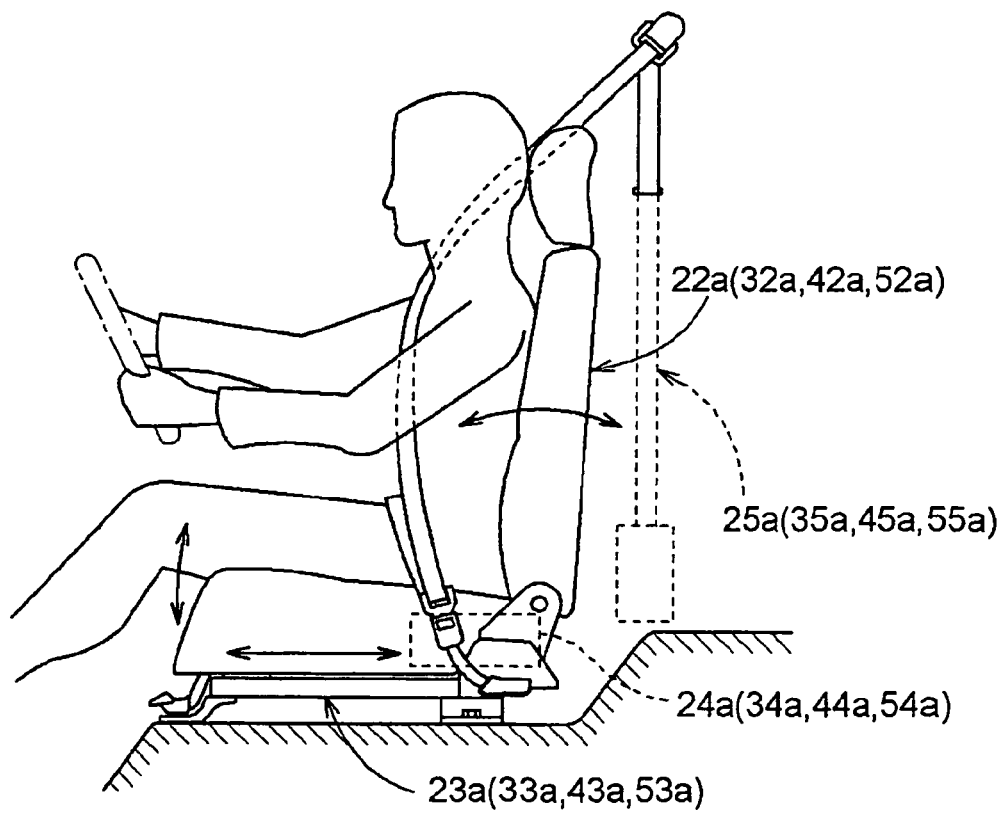

As is apparent from FIGS. 1A and 1B, according to embodiments of the present invention, occupants should be protected from injured as a result of a vehicle crash (including turnover and rollover), occupants who are seated at four seats in a vehicle. Four seats in a vehicle include a driver seat, a front passenger seat, a right back seat and a left back seat. In the case of other types of vehicles, such as a mini-van, occupants seated at other seats in a vehicle can equally be protected from injured as a result of a vehicle crash. However, according to the embodiments of the present invention, in order to simplify description, consideration is essentially given to the protection of occupants, who are seated at only the four seats, described above. The objects or units to be controlled by the occupant protection device according to the embodiments of the present invention are twenty one objects: side window mechanisms for the respective seats 21a, 31a, 41a and 51a; seat reclining mechanisms 22a, 32a, 42a and 52a; seat sliding mechanisms 23a, 33a, 43a and 53a for moving seats in a longitudinal direction; seat lifting mechanisms 24a, 34a, 44a and 54a for lifting seat cushions in a vertical direction; pre-crash seat belts 25a, 35a, 45a and 55a for rolling up seat belts; and a sunroof mechanism 10a provided at a vehicle ceiling portion. In addition to them, other components, such as head rest-operating mechanisms, can be considered as an object to be controlled by the occupant protection device according to the embodiments of the present invention.

First Embodiment

Figure 2:
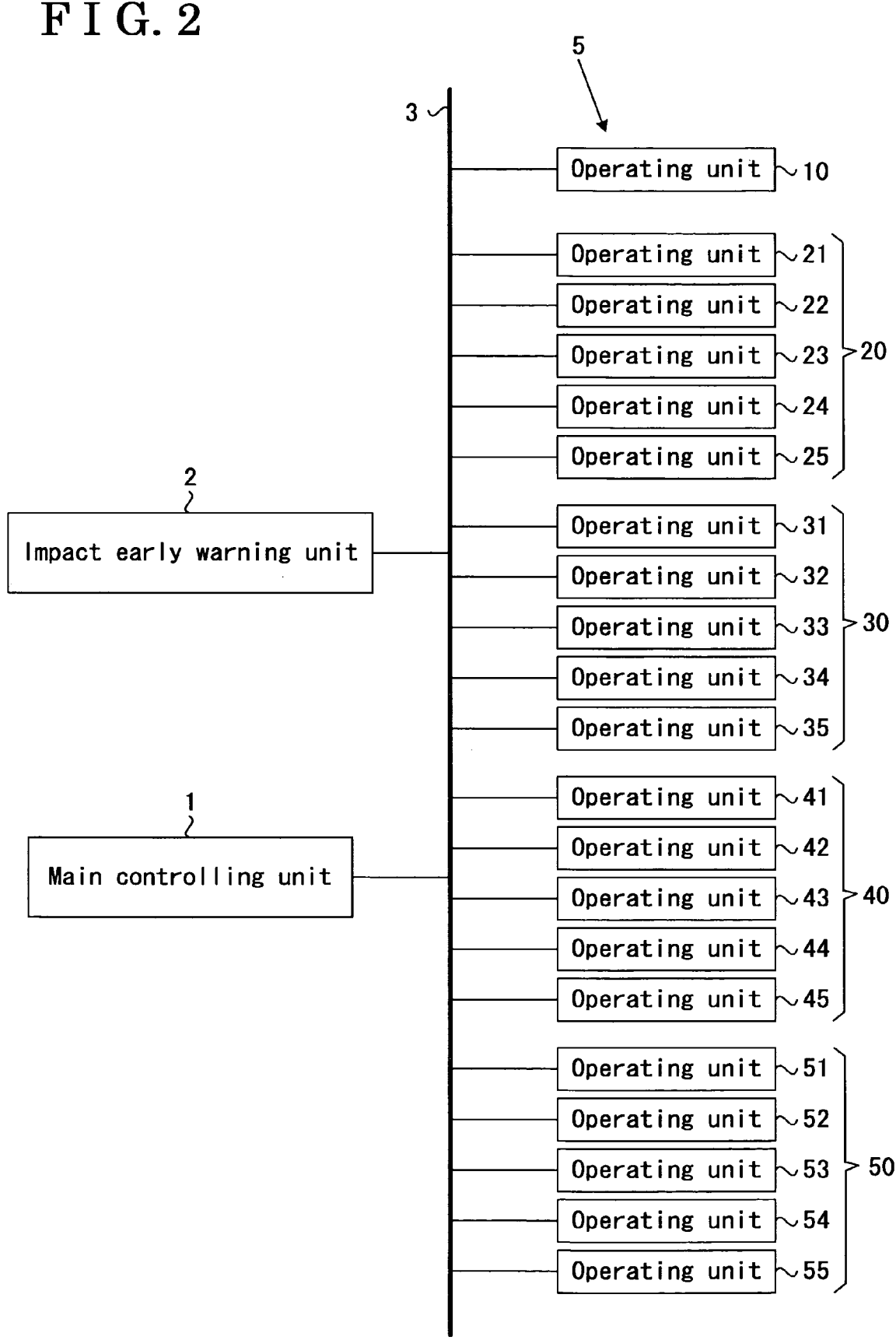
FIG. 2 is a block diagram illustrating a control circuit of an occupant protection device according to a first embodiment of the present invention.

As is illustrated in FIG. 2, an occupant protection device for a vehicle according to a first embodiment of the present invention includes a main controlling unit 1 (i.e., a controlling means) incorporating, therein, a microcomputer and a logical circuit, an impact early-warning unit 2 (i.e., an impact predicting means) configured with a millimeter-wave radar, and an operating unit 5. The impact early-warning unit 2 is employed so as to foresee or predict in advance, especially on the basis of a mileage relative to a target ahead, and a vehicle speed relative to the target ahead, a possibility, or otherwise, of a vehicle impact. The operating unit 5 is configured with twenty one operating units: an operating unit 10 for operating the sunroof mechanism 10a; operating units 21, 31, 41 and 51 for operating the side window mechanisms 21a, 31a, 41a and 51a; operating units 22, 32, 42 and 52 for operating the seat reclining mechanisms 22a, 32a, 42a and 52a; operating units 23, 33, 43 and 53 for operating the seat sliding mechanisms 23a, 33a, 43a and 53a; operating units 24, 34, 44 and 54 for operating the seat lifting mechanisms 24a, 34a, 44a and 54a; and operating units 25, 35, 45 and 55 for operating the pre-crash seat belts 25a, 35a, 45a and 55a. Each operating unit incorporated in the operating unit 5 receives, via a communication bus 3, information in connection with a possibility, or otherwise, of a vehicle impact foreseen by the impact early-warning unit 2. The main controlling unit 1 drives the operating units 21 to 55 for operating the respective objects or components 21a to 55a described above. The communication bus 3 is configured with data bus, address bus, and control bus. The control unit 1, the impact early-warning unit 2 and the operating unit 5, which all are connected to the communication bus 3, can combine with one another to perform multiplex inter-communication. Each control unit composing the operating unit 5 includes an actuator for operating each object, and a controller for controlling the actuator. In terms of an actuator, although a motor is employed as an actuator according to the first embodiment of the present invention, the actuator is not limited to a motor, and can be others such as a solenoid. In terms of a controller, a controller can be include a microcomputer, a logic circuit, or a driver circuit. According to the first embodiment of the present invention, the controller of each operating unit is configured with a motor driver circuit having both a microcomputer and a motor driver IC (integrated circuit).

As is illustrated in FIG. 2, the control circuit of the occupant protection device according to the first embodiment of the present invention is designed to control directly the twenty-one operating units 21 to 55 of the operating unit 5 by the main controlling unit 1. When a possibility of a vehicle impact is foreseen by the impact early-warning unit 2, the main controlling unit 1 implements a so-called series of pre-impact operations, by which the operating units 10 to 55 are sequentially operated in a manner such that each of the objects illustrated in FIG. 1A is brought to a condition appropriate to protect vehicle occupants.

As described above, according to the first embodiment of the present invention, because the respective operating units 10 to 55 are sequentially driven by the main controlling unit 1, the timings at which inrush current is supplied to motors of the operating units can vary. Therefore, it is possible to avoid or at least reduce a possibility of a drop in the degree of power supply voltage caused by factors, such as wire resistance, or by deficiencies in electric current supplied by a battery, factors which may occur due to an accumulation of inrush current. In this case, it is possible to effectively perform the series of pre-impact operations.

Figure 3:
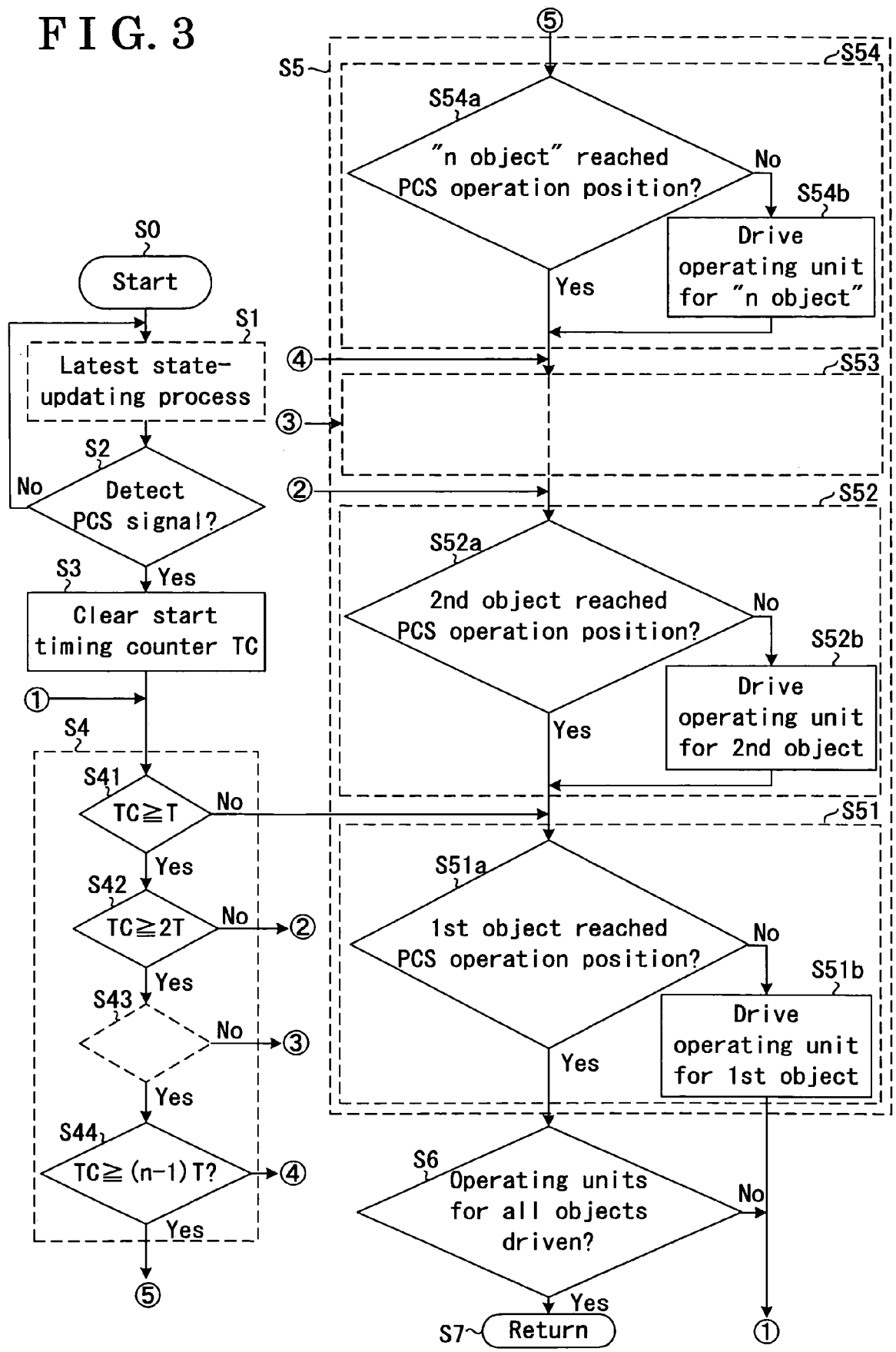
FIG. 3 is a flowchart for explaining a control implemented by the occupant protection device according to the embodiments of the present invention.

Next, described below with reference to FIG. 3 is a control implemented by the occupant protection device according to the first embodiment of the present invention. A control program from step S0 to step S7 is repeatedly implemented by the occupant protection device. The main controlling unit 1 starts this program at step S0. At step S1, a so-called latest state-updating process is implemented so as to obtain information such as a current position of each object to be controlled. After completing the latest state-updating process, at step S2, the main controlling unit 1 confirms information on a possibility, or otherwise, of a vehicle impact foreseen by the impact early-warning unit 2. According to the first embodiment of the present invention, the main controlling unit 1 confirms whether or not an impact early warning signal PCS is a positive one. The impact early warning signal PCS indicates a possibility, or otherwise, of a vehicle impact. In these circumstances, the control signals of the communication bus 3 can be allocated to the respective impact early warning signals PCS. Alternatively, the main controlling unit 1 can be connected, via direct signal lines, to the respective operating units 10 to 55. Still alternatively, flags can be set on and off in the main controlling unit 1, for example, by means of a resister, via the communication bus 3. A further alternative is that the main controlling unit 1 receives only information on a possibility of a vehicle impact from the impact early-warning unit 2, and on that basis determines a possibility of a vehicle impact. According to the first embodiment of the present invention, in order to simplify the description of the control program implemented by the main controlling unit 1, the flowchart illustrated in FIG. 3 explains that, it is step S2 at which the main controlling unit 1 determines a possibility, or otherwise, of a vehicle impact. However, this process, i.e., determination of a possibility, or otherwise, of a vehicle impact, is most likely to be needed in an emergency situation. Therefore, this process is not limited to the timing of step S2 in this control program illustrated in FIG. 3, and it is preferable that this process be implemented, by means of an interrupt routine, any time during this control program.

At step S2, when the main controlling unit 1 does not detect an impact early warning signal PCS, the program returns to step S1. Until the main controlling unit 1 detects an impact early warning signal PCS at step S2, a control flow between step S1 and step S2 is repeated. On the other hand, at step S2, when the main controlling unit 1 detects an impact early warning signal PCS, the program shifts to a next stage for performing a series of pre-impact operations. Through the stage of a series of pre-impact operations, at step S3, the main controlling unit 1 first clears a time counted by a start timing counter TC. The start timing counter TC starts a time counting operation, and measures an elapsed time.

At step S4, the main controlling unit 1 determines an elapsed time measured by the start timing counter TC. Step S4 contains sub-steps 41, 42, 43 and 44. At sub-step S41, the main controlling unit 1 determines whether an elapsed time measured by the start timing counter TC has reached, or is above, a predetermined time T. When an affirmative answer "Yes" is obtained at sub-step S41, i.e., when the main controlling unit 1 determines that an elapsed time measured by the start timing counter TC has reached, or is above, the predetermined time T, the program proceeds to sub-step S42. On the other hand, when a negative answer "No" is obtained at sub-step S41, i.e., when the main controlling unit 1 determines that an elapsed time measured by the start timing counter TC has not reached, and is less than, the predetermined time T, the program proceeds to sub-step S51 that is incorporated in step S5. The predetermined time T has been prescribed and stored in a storage unit, such as a memory, of the main controlling unit 1. After detecting an impact early warning signal PCS at step S2, it is sub-step S41 which is first implemented immediately after clearing an elapsed time measured by the start timing counter TC. Therefore, unless a set value of the predetermined time T is designed at zero, the program proceeds to sub-step S51.

At sub-step S51, the main controlling unit 1 controls, from among the objects 10a to 55a to be controlled, operation of a first object, i.e., controls one of the operating units which is placed first in a predetermined operating order. For example, on the assumption that the operating unit 10 illustrated in FIG. 2 is set to be the first in accordance with the predetermined operating order, it is the sunroof mechanism 10a that is operated by the operating unit 10. The controlling unit 1, at sub-step S51a, then determines whether the sunroof mechanism 10a has reached a pre-impact operation complete position. The pre-impact operation complete position is, hereinafter, referred to as a PCS operation position. When the sunroof mechanism 10a is determined at sub-step S51a to have not reached the PCS operation position, it is necessary to operate the sunroof mechanism 10a up to the PCS operation position. Therefore, the program proceeds to sub-step S51b from sub-step S51a for the purpose of activating the operating unit 10 for the first object. The program then returns to step S4 from sub-step S51b, in a manner such that the main controlling unit 1 confirms an elapsed time measured by the start timing counter TC.

In the second cycle, at sub-step S41, the main controlling unit 1 confirms whether an elapsed time measured by the start timing counter TC has reached, or is above, the predetermined time T. When a negative answer "No" is still obtained at sub-step S41, i.e., when an elapsed time measured by the start timing counter TC has not reached, or is less than, the predetermined time T, the program proceeds to step sub-step S51, wherein the above-described process is implemented. On the other hand, when an affirmative answer "Yes" is obtained at sub-step S41, i.e., when an elapsed time measured by the star timing counter TC has reached, or is above, the predetermined time T, the program proceeds to sub-step S42. At sub-step S42, the main controlling unit 1 confirms whether an elapsed time measured by the start timing counter TC has reached, or is above, a second predetermined time 2T (=T×2). When a negative answer "No" is obtained at sub-step S42, i.e., when the main controlling unit 1 confirms at sub-step S42 that an elapsed time measured by the start timing counter TC has not reached, or is less than, the second predetermined time 2T, the program proceeds to sub-step S52 that is incorporated in step S5.

At sub-step S52, the main controlling unit 1 controls operation of a second object from among the objects to be controlled, i.e., controls driving of the operating unit 21 which is placed second in the predetermined operating order. The controlling unit 1, first at sub-step S52a, determines whether the second object has reached the PCS operation position. When the second object is determined to have reached the PCS operation position, the program proceeds to sub-step S51. On the other hand, when the second unit is determined to have not reached the PCS operation position, the program proceeds to sub-step S52b for the purpose of activating the operating unit 21 for the second object. The program then proceeds to sub-step S51 from sub-step S52b. At sub-step S51, the same process as the above-description is implemented again. At this stage, when all of the operating units 10 to 55 have not been activated yet, the program returns step S4.

As described above, according to the first embodiment of the present invention, after detecting an impact early warning signal PCS outputted by the impact-predicting unit 2, the operating unit 10 for the first object is activated immediately after step S3 at which an elapsed time measured by the start timing counter TC is cleared. The operating unit 21 for the second object is activated immediately after sub-step S41 at which an elapsed time measured by the start timing counter TC is determined to have reached, or to be above, the predetermined time T. In other words, the operating unit 21 for the second object is activated in a time difference T after activation of the operating unit 10 for the first object.

At step S4, the number of sub-steps such as sub-steps S41 and S42 is identical to the number of intervals for sequentially activating the operating units corresponding to the objects to be controlled. As described above, according to the first embodiment of the present invention, there are twenty-one objects to be controlled, i.e., there are twenty-one controlling units 10 to 55 for the respective objects to be controlled. The number of intervals for sequentially activating these operating units thus amounts to twenty. That is, step S4 incorporates, therein, twenty sub-steps such as sub-steps S41 and S42. Each operating unit is sequentially activated at a time interval T. Each operating unit is activated through sub-steps that have been incorporated in step S5. In step S5, the number of sub-steps such as sub-steps S51 and S52 is identical to the number of the operating units 10 to 55 for the respective objects to be controlled. In other words, according to the first embodiment of the present invention, there are twenty-one sub-steps in step S5.

As described above, according to the first embodiment of the present invention, after counting the time interval T at step S4, the program is shifted from step S4 to step S5 at the time interval T, wherein totally twenty-one operating units are sequentially activated at the time interval T respectively. In the flowchart illustrated in FIG. 3, sub-step S43 has been described in order to abbreviate respective processes for determining whether times measured by the start counting timer TC have reached, or are above, times 3T (T×3) to 19T (T×19). When a negative answer "No" is obtained at sub-step S43, the program proceeds to sub-step S53. In the flowchart illustrated in FIG. 3, sub-step S53 has been described in order to abbreviate respective processes for activating, from among the operating units 10-55, the operating units that respectively operate the third to twentieth objects. When the operating unit 54 for the twentieth object is required to be activated, the program proceeds to the top of sub-step S53 in response to a negative answer obtained at sub-step S44.

At sub-step S44, the main controlling unit 1 determines whether an elapsed time measured by the start timing counter TC has reached, or is above, a predetermined time 20T (T×20). When a negative answer "No" is obtained at sub-step S44, i.e., when an elapsed time measured by the start timing counter TC has not reached, and is less than, the predetermined time 20T, the program proceeds to sub-step S53. On the other hand, when an affirmative answer "Yes" is obtained at sub-step S4, i.e., when an elapsed time measured by the start timing counter TC has reached, or is above, the predetermined time 20T, the program proceeds to sub-step S54 at which the operating unit 55 for the last object to be controlled is activated.

At sub-step S54a, the main controlling unit 1 determines whether the n object (the parameter "n" represents the total number of objects to be controlled) has reached the PCS operating position. When a negative answer "No" is obtained at sub-step S54a, i.e., when the n object has not reached the PCS operating position, the program proceeds to sub-step S54b at which wherein the operating unit for this n object is activated. The program then proceeds to sub-step S53 from sub-step S54. At this point, all of the operating units have been already activated. Therefore, at all sub-steps S54a, S52a and S51a, affirmative answers "Yes" are obtained. The program then proceeds to step S6 so as to determine whether the operating units for all objects to be controlled have been activated. At this stage, because all operating units have been already activated, the control program is terminated at step S7 and returns to step S0 to be resumed.

Figure 4:
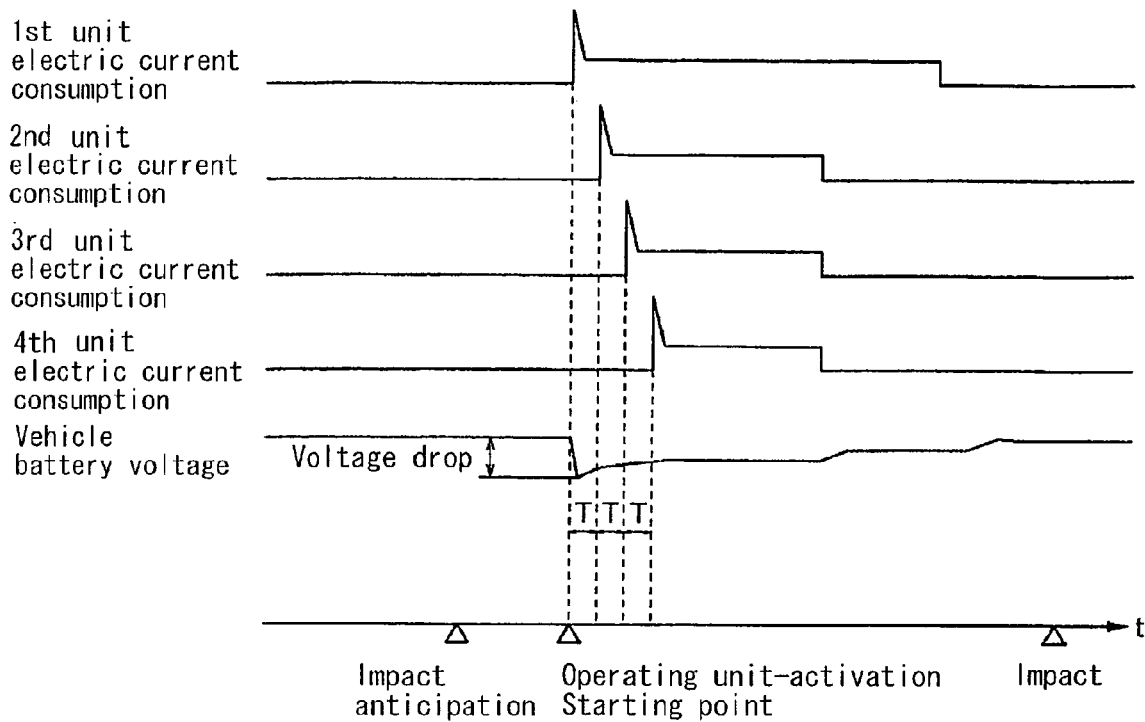
FIG. 4 is a waveform chart for explaining transitions in degrees of electric power consumed in the course of driving actuators that can operate controlled objects according to a first embodiment of the present invention.

As described above, according to the first embodiment of the present invention, all operating units 10 to 55 for the objects to be controlled are sequentially activated in accordance with the flowchart illustrated in FIG. 3. As is summarized in FIG. 4, the timings of inrush current supplied to the actuators (e.g. motors) of the respective operating units 10 to 55 for the controlled objects can be varied at the time interval T. Therefore, it is possible to reduce in a dropped amount of power supply voltage. The waveform illustrated in FIG. 4 summarizes timings at which inrush current is supplied to four actuators for the first, second, third and fourth objects, in order to simplify the description. According to the first embodiment of the present invention, the respective time intervals between activation of a operating unit and next activation of another operating unit are fixed at the time intervals T. However, these time intervals therebetween do not have to be limited to the above, and can vary respectively.

As described above, according to the first embodiment of the present invention, the occupant protection device for vehicle is configured with the impact early warning unit 2 (i.e., the impact predicting means), the main controlling unit 1 (i.e., the controlling means) for controlling activations of the plural operating units mounted on a vehicle. On the basis of outputs from the impact early warning unit 2, the main controlling unit I sequentially controls activations of the plural operating units in accordance with the predetermined operating order. No explanation has been offered above about specific methods for determining in particular an operating order. However, it is preferable that the operating order be settled in such a way that operating units that require longer operating times between initial activation and termination of activation be correspondingly placed higher in the operating order. In other words, the longer the operating time of an operating unit, the earlier it should be started, and in consequence even when actuators are started in order, it is possible to abbreviate, in all the control operations, the time for which all the controlled objects could reach the PCS operation positions.

Moreover, it is preferable that the operating order be settled in such a way that the operating units be placed higher on the basis of a degree of influence imposed on a vehicle occupant. Therefore, it is possible to activate precedently actuators that should be considered highly on the basis with degrees of influence imposed on a vehicle occupant, thereby improving security.

Next, described below is an operating order in terms of an operating time.

For example, on the assumption that an operating time of the sunroof mechanism 10a is most long, the operating unit 10 for the sunroof mechanism 10a is placed first as the first unit. Further, on the assumption that the operating times of side window mechanisms 21a, 31a, 41a and 51a are shorter than the operating time of the sunroof mechanism 10a, and are longer than operating period of times of other components, the operating units 21, 31, 41 and 51 are placed second, third forth and fifth as second, third, fourth and fifth units. Still further, on the assumption that operating times for the seat reclining mechanisms 22a, 32a, 42a and 52a are shorter than the operating times of the sunroof mechanism 10a, and the side window mechanisms 21a, 31a, 41a and 51a, and longer than operating period of times of other components, the operating units 22, 32, 42 and 52 are placed sixth, seventh, eighth, ninth as sixth, seventh, eighth and ninth units. Sill further, on the assumption that the operating times for the pre-crash seat belt mechanisms 25a, 35a, 45a and 55a are most least, the operating units 25, 35, 45 and 55 are placed eighteenth, nineteenth, twentieth and twenty-first as eighteenth, nineteenth, twentieth and twenty-first units.

Figure 5:
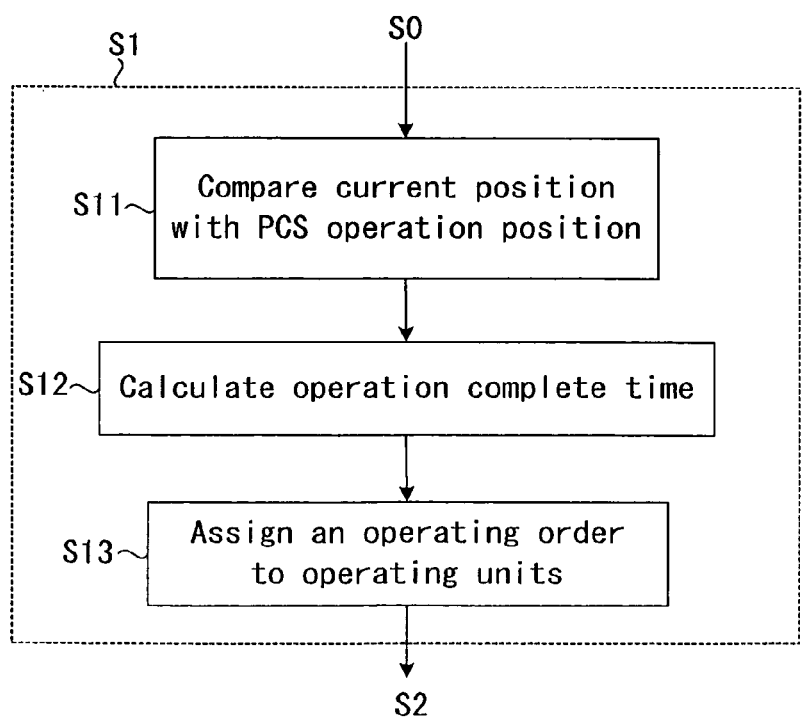
FIG. 5 is a flowchart for explaining another control implemented by the occupant protection device according to the first embodiment of the present invention.

However, the operating order does not have to be always fixed as described above. It is preferable that the operating order varies as a result of comparison between a current position of each object and the PCS operation position thereof. As is summarized in the flowchart illustrated in FIG. 3, at step S1, the latest state-updating process is implemented so as to obtain information such as a current position of each object to be controlled. In order to vary the operating order in an appropriate manner, the processes illustrated in FIG. 5 can be additionally implemented during the process at step S1. Specifically, at sub-step S11, the main controlling unit 1 compares a current position of each object with the PCS operation position thereof. At sub-step S12, the main controlling unit 1 calculates an operating time required for each object to reach the PCS operation position. At sub-step S13, on the basis of the calculated operating times, the main controlling unit 1 updates the operating order as needed.

As described above, according to the first embodiment of the present invention, for example, when the sunroof mechanism has closed an opening portion defined at a vehicle ceiling, there is no need to drive the operating unit 10 for the sunroof mechanism 10a. In such a case, it is possible to abbreviate an operating time at least at the time interval T. Further, when a vehicle seat has been positioned remarkably forwards or rearwards, it is possible to place the operating units in connection with the vehicle seat higher in the operating order, thereby enabling to bring quickly the vehicle seat to the PCS operation position.

Second Embodiment

Figure 6:
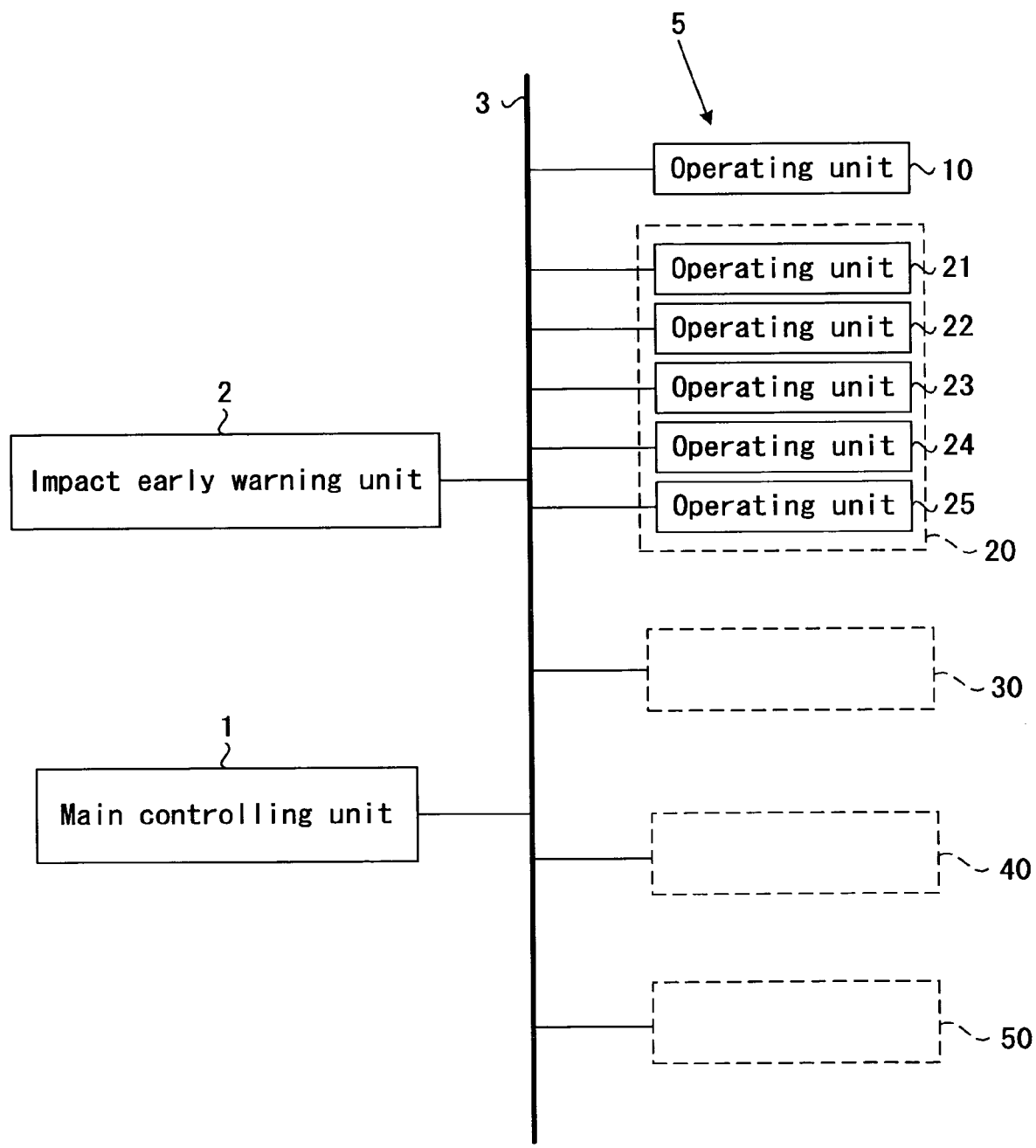
FIG. 6 is a block diagram illustrating a control circuit of an occupant protection device according to a second embodiment of the present invention.
Figure 7:
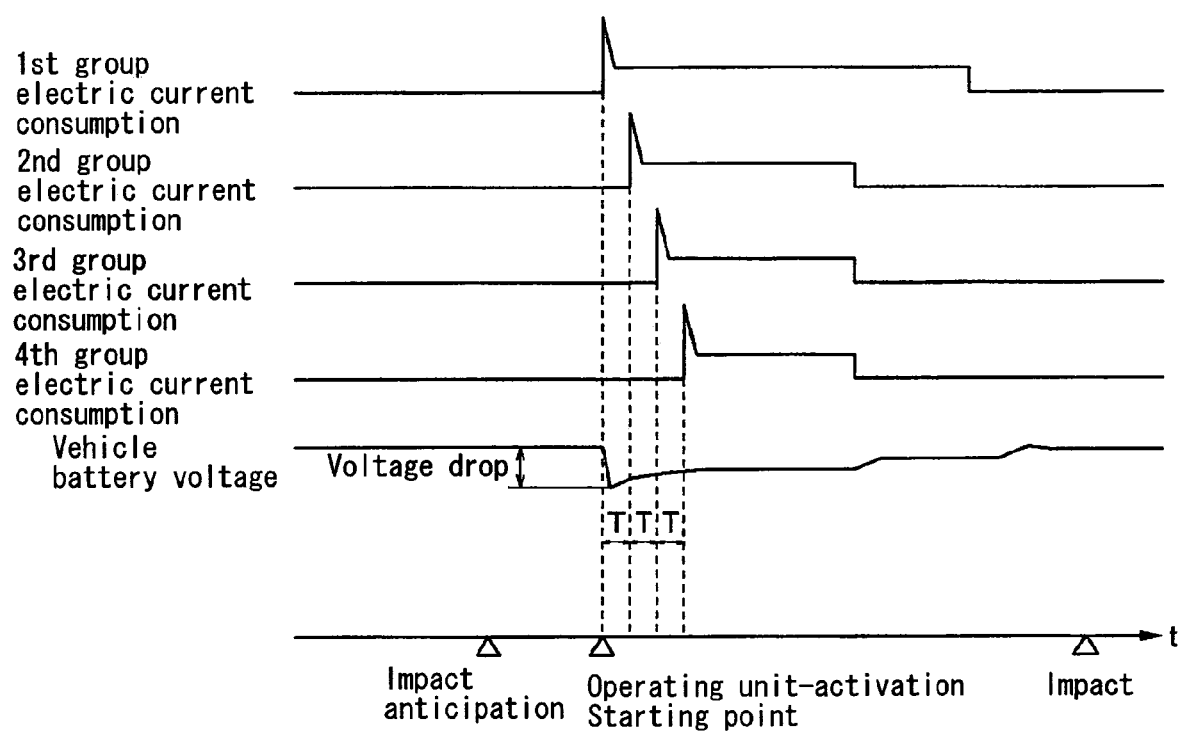
FIG. 7 is a waveform chart for explaining transitions in degrees of electric power consumed in the course of driving actuators that can operate controlled objects according to the second embodiment of the present invention.

With reference to FIGS. 6 and 7, an occupant protection device for vehicle according to a second embodiment of the present invention is described below. As is apparent from FIG. 6, the operating units 10 to 55 are classified into plural operating unit groups. The main controlling unit 1 controls sequentially driving these plural operating unit groups in an operating order. In other words, the occupant protection device for vehicle according to the second embodiment of the present invention includes both the impact early-warning unit 2 (i.e., the impact predicting means) that is employed so as to predict or anticipate in advance a possibility, or otherwise, of a vehicle impact, and the main controlling unit 1 (i.e., a controlling means) controlling activation of the plural operating units (actuators) 10 to 55 mounted on a vehicle. The plural operating units 10 to 55 have been classified, in accordance with a predetermined classification condition, into the plural operating unit groups (actuator groups). On the basis of outputs by the impact early-warning unit 2, the main controlling unit 1 sequentially drives the operating units classified into the respective groups in accordance with a predetermined order of precedence in terms of the operating unit groups.

As one of specific methods of controlling implemented by the main controlling unit 1, the operating units during the control processes according to the first embodiment can be substituted by the operating unit groups, and others are the same as the first embodiment. Therefore, description on the method of controlling implemented by the main controlling unit 1 according to the second embodiment will be omitted herein in order to simplify the description. According to the second embodiment, the operating units that have been classified in the same group can be driven at the same time. However, by adjusting the number of operating units classified in each operating unit group to be appropriate, it is possible to reduce an amount of dropped battery voltage, drop that may occur due to an accumulation of inrush current. In this case, comparing with an amount of inrush current that is consumed by all the operating units that are activated at the same time, an amount of inrush current according to the second embodiment can be effectively reduced.

Various types of possible method of classifying the operating units 10 to 55 into operating unit groups can be suggested. For example, as illustrated in FIG. 6, the classification condition is prescribed on the basis of an area inside a vehicle, at area at which the object operated by each operating unit (actuator) has been arranged. In other words, the operating unit 10 for operating the sunroof mechanism 10a is classified independently as an operating unit group 10, and other operating units 21 to 55 for the controlled objects are classified, in accordance with areas at which the respective operating units are arranged, into operating unit groups 20, 30, 40 and 50. Specifically, the operating units 21, 22, 23, 24 and 25, all which are arranged at the same area within a vehicle, are classified into the operating unit group 20. The total number of operating unit groups then amounts to five. According to the aforementioned method of classifying the operating units, it is possible to make the controlled objects classified in each operating unit group clear. Therefore, the operating units that are associated to a seat at which no occupant is seated can be excluded from the units to be activated by the main controlling unit 1. As a result, it is possible to avoid, or at least reduce, an amount of dropped power supply voltage, a drop which may occur due to inrush current, and is also possible to abbreviate a time for completing a series of pre-impact operations. Moreover, it is possible to drive actuators which are highly relevant to each other. For example, when the actuators for operating a seat sliding mechanism and a seat reclining mechanism for a seat are classified into an actuator group, it is possible to implement the series of pre-impact operations without giving uncomfortable feeling to a vehicle occupant.

Further, it is still preferable that the classification condition be determined in a manner such that the amounts of electric current, which is consumed immediately after activating the operating units (actuators) classified into each operating unit group, can be substantially smoothed among the respective operating unit groups. For example, as described above, when the operating units 10 to 55 are classified in to each operating unit group in accordance with each vehicle seat, the number of actuators contained in the operating units can be equally allocated into each operating unit group. Therefore, an amount of inrush current at the event of an initial motor driving can be equalized among the operating unit groups. Needless to say, it is preferable that the operating units be classified into each operating unit group by other classifying methods in a manner such that the amount of electric current consumed can be smoothed about the respective operating unit groups. In each method, by classifying the operating units in a manner such that the amount of electric current consumed can be smoothed among the respective operating unit groups, it is possible to effectively calculate an influence applied to the power supply voltage. Moreover, even if a control implemented, a control by which an amount of dropped power supply voltage that may occur due to inrush current is restrained, it is possible to restrain an increase in a time for terminating the series of pre-impact operations.

Still further, it is preferable that the classification condition be determined in a manner such that an operating time from initial activation, to termination of activation of, each actuator classified into each operating unit group can be equalized. For example, operating units for the side windows of each vehicle seat can be classified into the same operating unit group. In this case, an operating time from initial activation, to termination of activation of, each actuator classified into each operating unit group can be smoothed. Therefore, it is possible to avoid unnecessary or extra operating time. Moreover, it is possible to avoid, or at least reduce, a drop in a power supply voltage, a drop which may occur due to inrush current, and is possible to restrain an increase in a time required to complete the series of pre-impact operations. Because the operating time can vary depending upon a current position of each component (object), it is preferable that, at step S13 illustrated in FIG. 5, the operating units in each operating unit group be assigned with an operating order, and be classified in terms of operating times.

A further alternative is that the classification condition can be determined on the basis of a degree of influence applied to a vehicle occupant protection. In consideration of possible influences applied to a vehicle occupant protection, the main controlling unit 1 has prepared in advance several patterns of classification. The impact early-warning unit 2 predict and foresee a possibility, or otherwise, of a vehicle impact, and outputs information on a type of vehicle impact. On the basis of information outputted by the impact early-warning unit 2, the main controlling unit 1 can select one classification from among the several patterns of classification and implement activation of the operating units.

Third Embodiment

Figure 8:
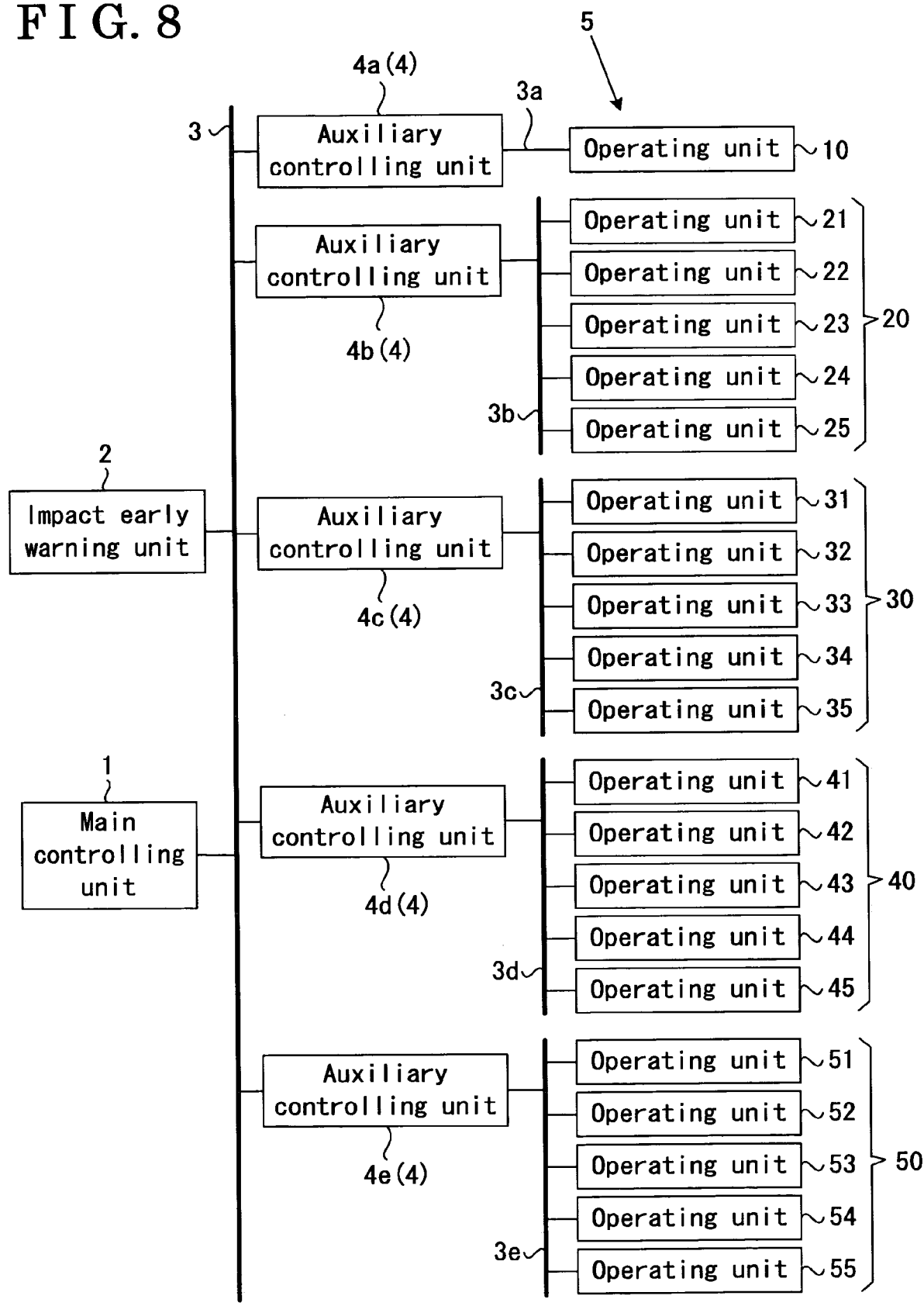
FIG. 8 is a block diagram illustrating a control circuit of an occupant protection device according to a third embodiment of the present invention.
Figure 9:
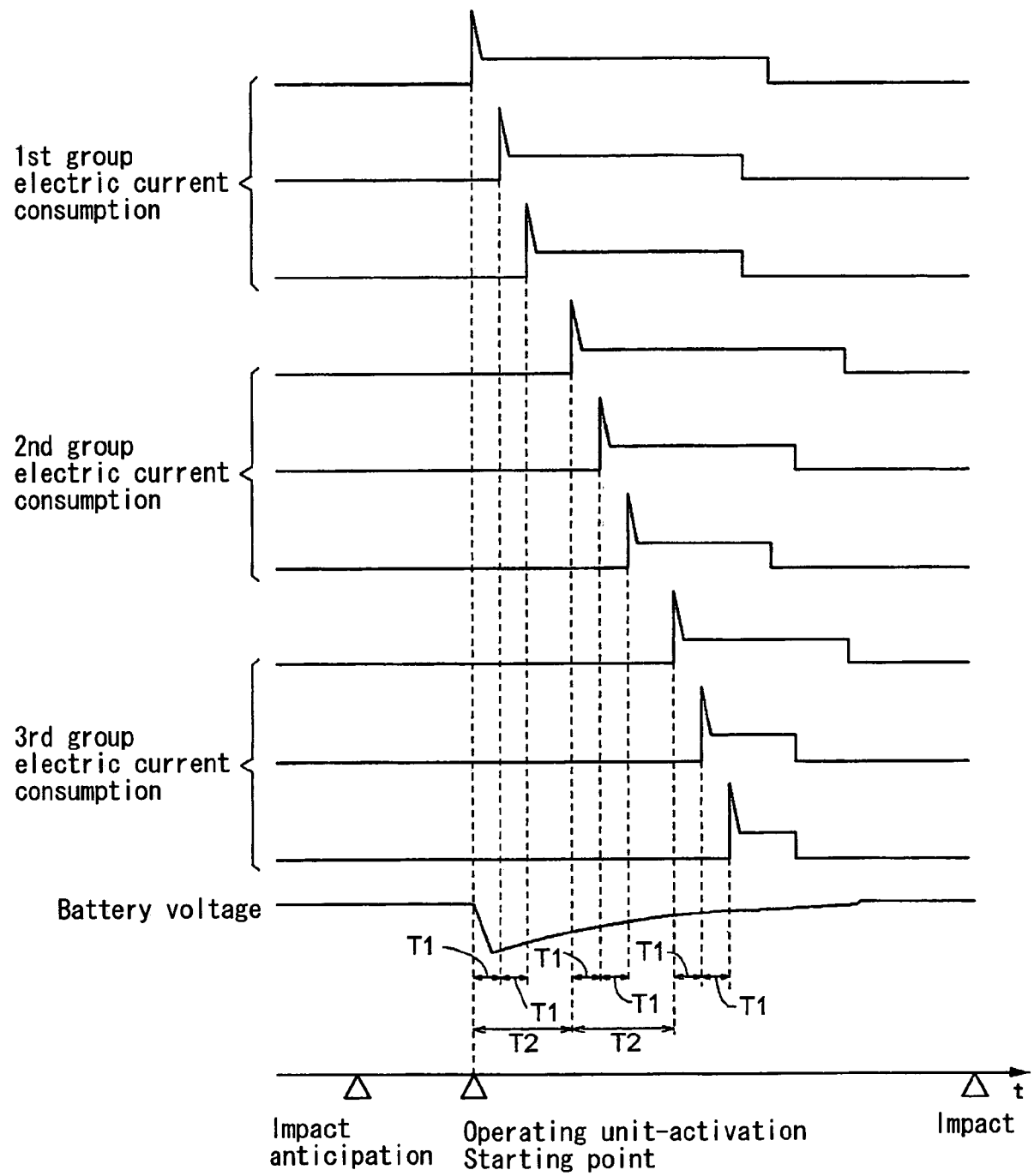
FIG. 9 is a waveform chart for explaining transitions in degrees of electric power consumed in the course of driving actuators that can operate controlled objects according to the third embodiment of the present invention.
Figure 10:
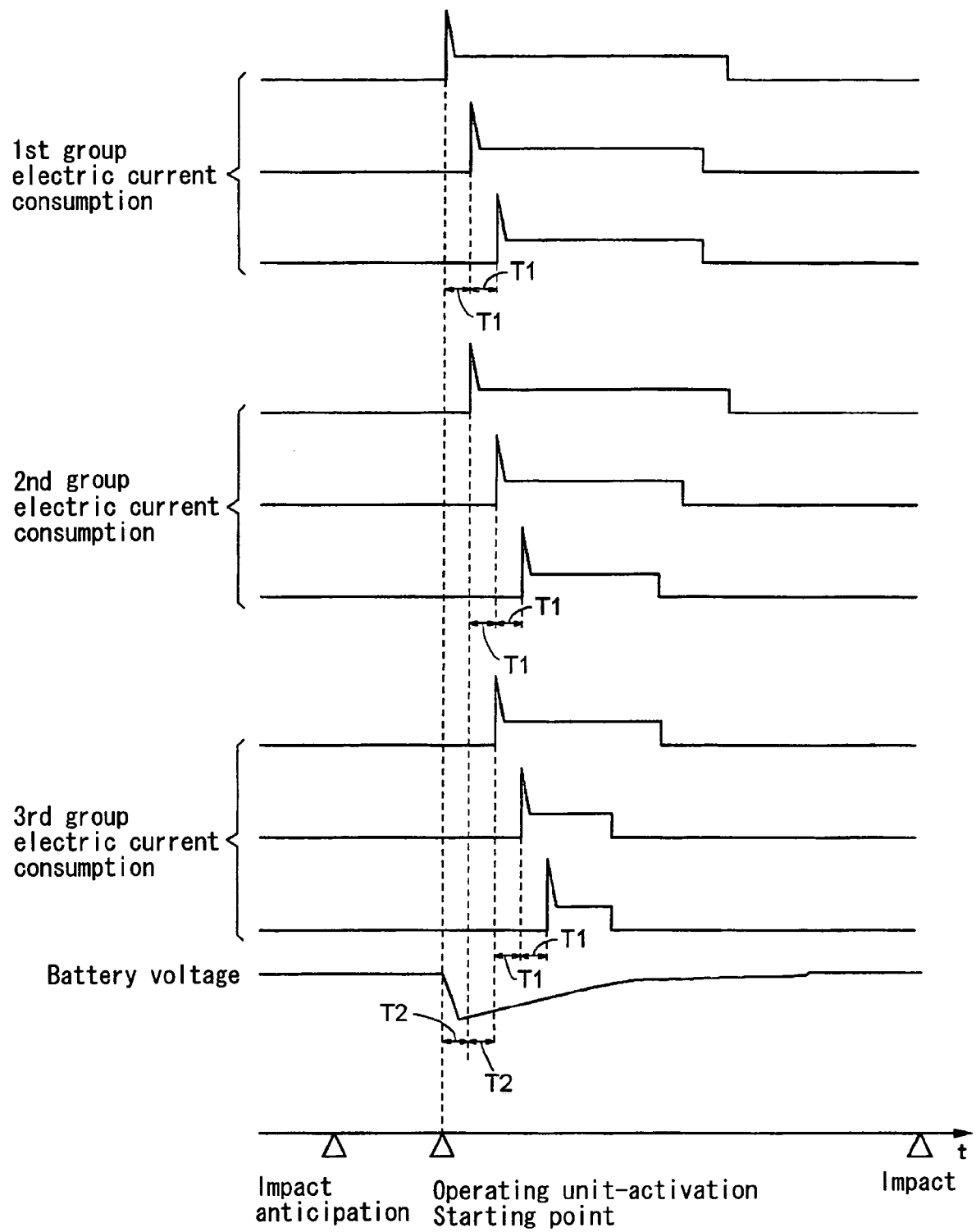
FIG. 10 is another waveform chart for explaining another transitions in degrees of electric power consumed in the course of driving actuators that can operate controlled objects according to the third embodiment of the present invention.
Figure 11:
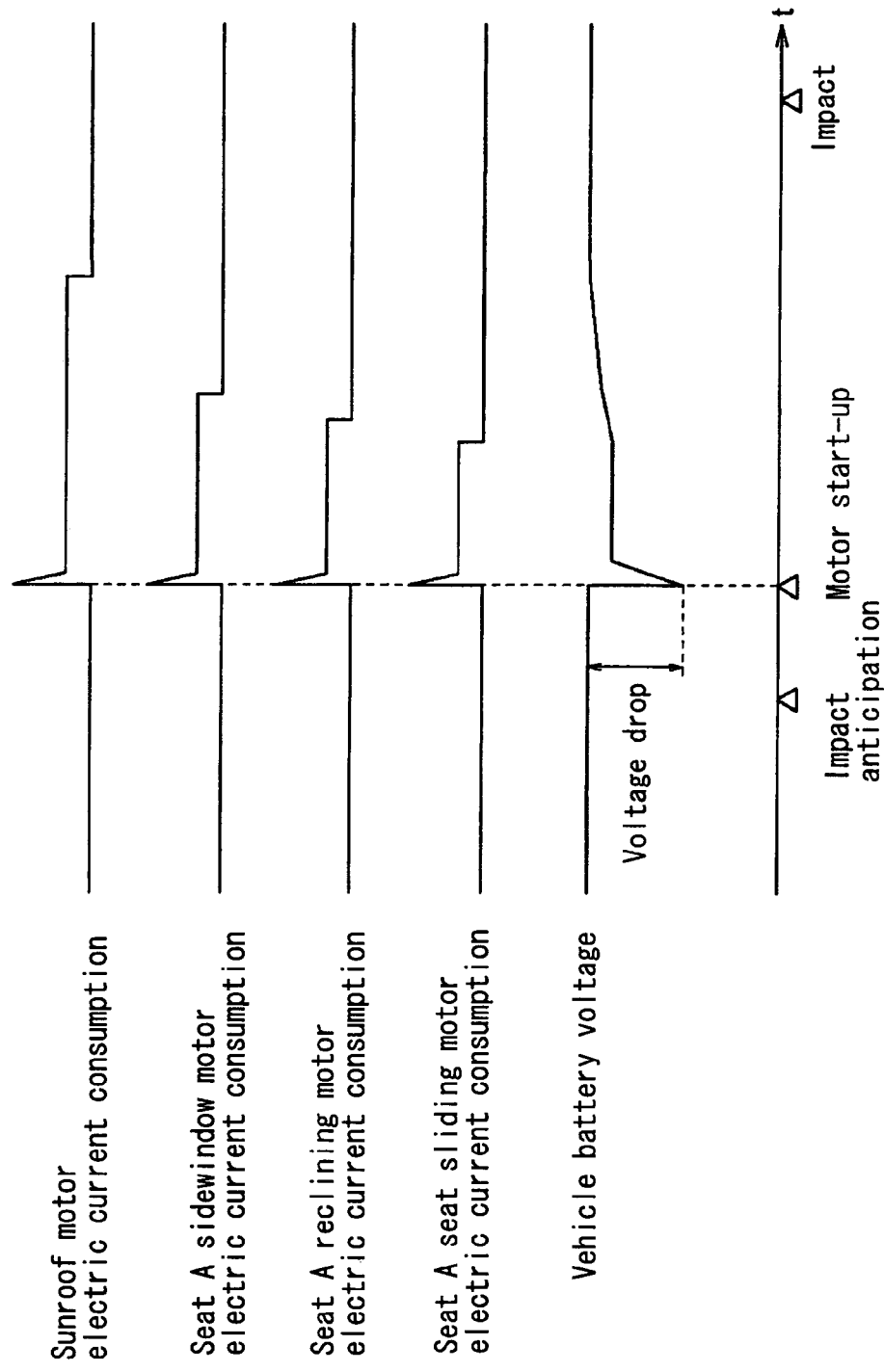
FIG. 11 is a waveform chart for explaining transitions of a degree of electric current consumed by driving motors, which can capable of operate a sun roof, a side window of a vehicle seat, a seat sliding mechanism and a seat reclining mechanism according to a conventional work.

With reference to FIGS. 8 and 9, an occupant protection device for vehicle according to a third embodiment of the present invention is described below. As is apparent from FIG. 8, via the communication bus 3, the main controlling unit 1 (i.e., main controlling means), the impact early-warning unit 2 (i.e., the impact predicting means), and plural auxiliary controlling unit 4 having 4a, 4b, 4c, 4d and 4e (i.e., plural auxiliary controlling means) are connected to one another. Each auxiliary controlling unit 4 is connected, via sub-communication busses 3a, 3b, 3c, 3d and 3e, to the operating units that each auxiliary controlling unit 4 should control. The occupant protection device for vehicle according to the third embodiment of the present invention includes the impact early-warning unit 2 (i.e., the impact-predicting means) that is employed so as to predict or anticipate in advance a possibility, or otherwise, of a vehicle impact, and the main controlling unit 1 (i.e., a controlling means) controlling activation of the plural operating units (actuators) 10 to 55 mounted on a vehicle. The occupant protection device further includes the plural auxiliary controlling units 4a, 4b, 4c, 4d and 4e which respectively control driving of each operating unit classified into plural operating unit groups (actuator groups) in accordance with a predetermined classification condition. Each operating unit group is assigned with a single auxiliary controlling unit. On the basis of at least an outputs from the impact early-warning unit 2, the main controlling unit 1 outputs signals to the respective auxiliary controlling units 4a, 4b, 4c, 4d and 4e, signals which indicates command to sequentially drive the plural operating unit groups in accordance with a predetermined order of precedence. Each auxiliary controlling unit 4a, 4b, 4c, 4d and 4e sequentially drives, in accordance with a predetermined operating order, each operating unit classified in each operating unit group.

As is illustrated in FIG. 8, according to the third embodiment, the auxiliary controlling unit 4a controls activation of the operating unit 10 that operates the sunroof mechanism 10a. The auxiliary controlling unit 4b controls activation of the operating units 21, 22, 23, 24 and 25 that respectively operate the side windows mechanism 21a, the seat reclining mechanism 22a, the seat sliding mechanism 23a, the seat lifting mechanism 24a, the pre-crash seat belt 25a, all of which are provided for a driver seat. The auxiliary controlling unit 4c controls activation of the operating units 31 32, 33, 34 and 35 that respectively operates those, all of which are provided for a front passenger seat. The auxiliary controlling unit 4d controls activation of the operating units 41, 42, 43, 44 and 45 that respectively operates those, all of which are provided for a right back seat. The auxiliary controlling unit 4e controls activation of the operating units 51, 52, 53, 54 and 55 that respectively operates those, all of which are provided for a left back seat. Each auxiliary controlling unit 4a, 4b, 4c, 4d and 4e controls activation of the respective operating units in accordance with the control program illustrated in FIG. 3. The main controlling unit 1 controls the plural auxiliary controlling units 4a, 4b, 4c, 4d and 4e in attendance with the control program illustrated in FIG. 3, and eventually controls activation of all the operating units 10 to 55.

Next, described below is a method of controlling the operating units in accordance with the flowchart illustrated in FIG. 3. In order to simplify the description, only the auxiliary controlling unit 4b is taken as an example.

The main controlling unit 1 starts this program at step S0. At step S1, the latest state-updating process is implemented so as to obtain information such as a current position of each object to be controlled. After completing the latest state-updating process, at step S2, the main controlling unit 1 confirms a drive command from the impact early-warning unit 2. This drive command corresponds to an impact early warning signal PCS. At step S3, the main controlling unit 1 clears a time counted by the start timing counter TC. At sub-step S41, the main controlling unit 1 determines whether an elapsed time measured by the start timing counter TC has reached, or is above, the predetermined time T. According to the third embodiment of the present invention, the auxiliary controlling unit 4b controls activation of the five operating units 21, 22, 23, 24 and 25. The number of time intervals for activating these five operating units thus amounts to four (n−1=5−1). Therefore, it is considered that a process such as sub-step S41 is implemented totally four times within step S4. The control program shifts to step S5 following the respective processes in step S4. The auxiliary controlling unit 4b controls activation of the operating units 21, 22, 23, 24 and 25 corresponding to the first unit to the n unit (according to the third embodiment, the n unit is the fifth unit). The program then proceeds to step S6 so as to determine whether the operating units for the objects to be controlled have been activated by the auxiliary controlling unit 4b. When an affirmative answer "Yes" is obtained at step S6, the program proceeds to step S7 so as to be terminated. Identical processes can be implemented by the auxiliary controlling units 4c, 4d and 4e. Likewise, although the number of actuators to be controlled by the auxiliary controlling unit 4a is not identical to that to be controlled by other auxiliary controlling units, an identical process can be implemented by the auxiliary controlling unit 4a.

Next, described below is an example of controlling the plural auxiliary controlling units by the main controlling unit 1, with reference to FIG. 3.

The main controlling unit 1 starts this program at step S0. At step S1, the latest state-updating process is implemented so as to obtain information such as a current position of each object to be controlled. After completing the latest state-updating process, at step S2, the main controlling unit 1 confirms whether an impact early warning signal PCS ha been outputted by the impact early-warning unit 2. At step S3, the main controlling unit 1 clears a time counted by the start timing counter TC. At sub-step S41, the main controlling unit 1 determines whether an elapsed time measured by the start timing counter TC has reached, or is above, a predetermined time T2 that corresponds to the predetermined time T. The predetermined time T2 is designed as a time required for completely activating all operating units for the controlled objects. According to the third embodiment of the present invention, the main controlling unit 1 controls activation of the five auxiliary controlling units 4a, 4b, 4c, 4d and 4e. The number of time intervals for activating the five auxiliary controlling units thus amounts to four (n−1=5−1). Therefore, it is considered that a process such as sub-steps S41, S42, S43 and S44 ism implemented totally four times within step S4. The control program shifts to step S5 following the respective processes in step S4. At sub-steps S51, S52, S53 and S54, the main controlling unit 1 sequentially outputs drive commands to the auxiliary controlling unit 4a for the first operating unit group, to the auxiliary controlling unit 4b for the second operating unit group, to the auxiliary controlling unit 4c for the third operating unit group, to the auxiliary controlling unit 4d for the fourth operating unit group, and to the auxiliary controlling unit 4e for the fifth operating unit group.

As described above, according to the third embodiment of the present invention, on the basis of the at least one output by the impact early-warning unit 2, the main controlling unit 1 sequentially outputs drive commands, in accordance with the predetermined order of precedence, to the respective auxiliary controlling units 4a, 4b, 4c, 4d and 4e. Each auxiliary controlling unit controls, in accordance with the predetermined operating order, activation of the operating units classified into each operating unit group. Eventually, the main controlling unit 1 activates all the operating units 10 to 55.

FIG. 9 is a waveform chart for explaining transitions in degrees of electric power consumed in the course of driving the first operating unit groups, the second operating unit groups, and the third operating unit groups, each of which contains three operating units. As is apparent from FIG. 9, inrush current consumed immediately after activating the actuators are not accumulated at the same time. Therefore, it is possible to provide an occupant protection device, which is effectively capable of avoiding, or at least reducing, an amount of dropped power supply voltage.

According to the waveform chart illustrated in FIG. 9, after the activation of the operating units by the auxiliary control unit, the operating units which have been classified in to the first operating unit group, the operating units that have been classified into the second operating unit group are activated by another auxiliary control unit. However, the process to activate the operating units are not limited to the above, and the operating units that have been classified into the second operating unit group can be activated prior to termination of the activation of the operating units that have been classified into the first operating unit group.

According to the third embodiment of the present invention, a classification condition for classifying the operating units, the operating order for activating the operating units, the order of precedence of the auxiliary controlling units, to which the main controlling unit 1 outputs drive commands, can be determined in the same manner as the first and second embodiments. Moreover, according to the third embodiment of the present invention, the time intervals T1 and T2 are fixed. However, the time intervals T1 and T2 can be designed to vary depending on the operating units, or on the auxiliary controlling units.

As described above, according to the embodiments of the present invention, it is possible to provide an occupant protection device, according to which a possibility of a vehicle impact can be detected, and conditions inside a vehicle, such as seat postures and safety devices, can be brought to a high level of safety quickly, and thereafter maintained effectively at a high level of safety.

The principles, the preferred embodiment and mode of operation of the present invention have been described in the foregoing specification. However, the invention, which is intended to be protected, is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. An occupant protection device for vehicle comprising:
    an impact-predicting means for predicting an impact of a vehicle;
    a controlling unit controlling activation of plural actuators mounted on the vehicle, the plural actuators classified into plural actuator groups in accordance with a predetermined classification condition, the controlling unit sequentially providing, on a basis of at least an output from the impact-predicting unit and in accordance with a predetermined order of precedence in terms of the actuator groups, actuators classified into the respective actuator groups with electric current at different timings, so as to vary a timing of inrush current supplied to the respective actuators;
    wherein said plural actuator groups comprise a first actuator group and a second actuator group, and an electric current timing of the second actuator group is provided a predetermined time after an electric current timing of the first actuator group so as to equalize, among the plural actuator groups, amounts of respective electric current that is consumed immediately after activating the respective actuators.

2. An occupant protection device for vehicle according to claim 1, wherein the classification condition is determined so as to equalize an operating time from initial activation, to termination of activation of, each of the actuators classified into each of the actuator groups.

3. An occupant protection device for vehicle according to claim 2, wherein plural actuators for side windows of each vehicle seat can be classified into a same actuator group.

4. An occupant protection device for vehicle according to claim 1, wherein the classification condition is determined on a basis of an area inside a vehicle at which controlled objects corresponding to the respective actuators are arranged.

5. An occupant protection device for vehicle according to claim 4, wherein the classification condition is determined on a basis of at which vehicle seat the controlled objects are provided.

6. An occupant protection device for vehicle according to claim 1, wherein actuators for operating a seat sliding mechanism and a seat reclining mechanism for a seat are classified into a same actuator group.

7. An occupant protection device for vehicle comprising:
    an impact-predicting unit predicting an impact of a vehicle;
    a main controlling unit controlling, via plural auxiliary controlling units, activation of plural actuators mounted on the vehicle, the plural actuators classified into plural actuator groups in accordance with a predetermined classification condition, the main controlling unit sequentially outputting, on a basis of at least one output from the impact-predicting unit and in accordance with a predetermined order of precedence, drive commands to the respective plural auxiliary controlling units, and the respective plural auxiliary controlling unit sequentially providing, in accordance with a predetermined operating order, the respective actuators classified into the respective actuator groups with electric current at different timings, so as to vary a timing of inrush current supplied to the plural actuators;

wherein said plural actuator groups comprise a first actuator group and a second actuator group, and an electric current timing of the second actuator group is provided a predetermined time after an electric current timing of the first actuator group so as to equalize, among the plural actuator groups, amounts of respective electric current that is consumed immediately after activating the respective actuators.

8. An occupant protection device for vehicle according to claim 7, wherein the actuators that require longer operating times between initial activation and termination of activation are placed at a higher priority in the predetermined operating order.

9. An occupant protection device for vehicle according to claim 7, wherein the classification condition is determined so as to equalize an operating time from initial activation, to termination of activation of, each of the actuators classified into each of the actuator groups.

10. An occupant protection device for vehicle according to claim 9, wherein plural actuators for side windows of each vehicle seat can be classified into a same actuator group.

11. An occupant protection device for vehicle according to claim 7, wherein the classification condition is determined on a basis of an area inside a vehicle at which controlled objects corresponding to the respective actuators are arranged.

12. An occupant protection device for vehicle according to claim 11, wherein the classification condition is determined on a basis of at which vehicle seat the controlled objects are provided.

13. An occupant protection device for vehicle according to claim 7, wherein the main controlling means is connected to the plural auxiliary controlling means via a communication bus.

14. An occupant protection device for vehicle according to claim 7, wherein the controlling unit varies the operating order based on the operating times between a current position of each object and a pre-impact operation complete position of the each object.

15. An occupant protection device for vehicle according to claim 7, wherein actuators for operating a seat sliding mechanism and a seat reclining mechanism for a seat are classified into a same actuator group.

* * * * *